Sept. 8, 1959   B. ROSSI ET AL   2,903,691
RANGE TRACKING CIRCUIT
Filed Feb. 1, 1946   2 Sheets-Sheet 1

INVENTORS
BRUNO ROSSI
KENNETH I. GREISEN
BY
ATTORNEY

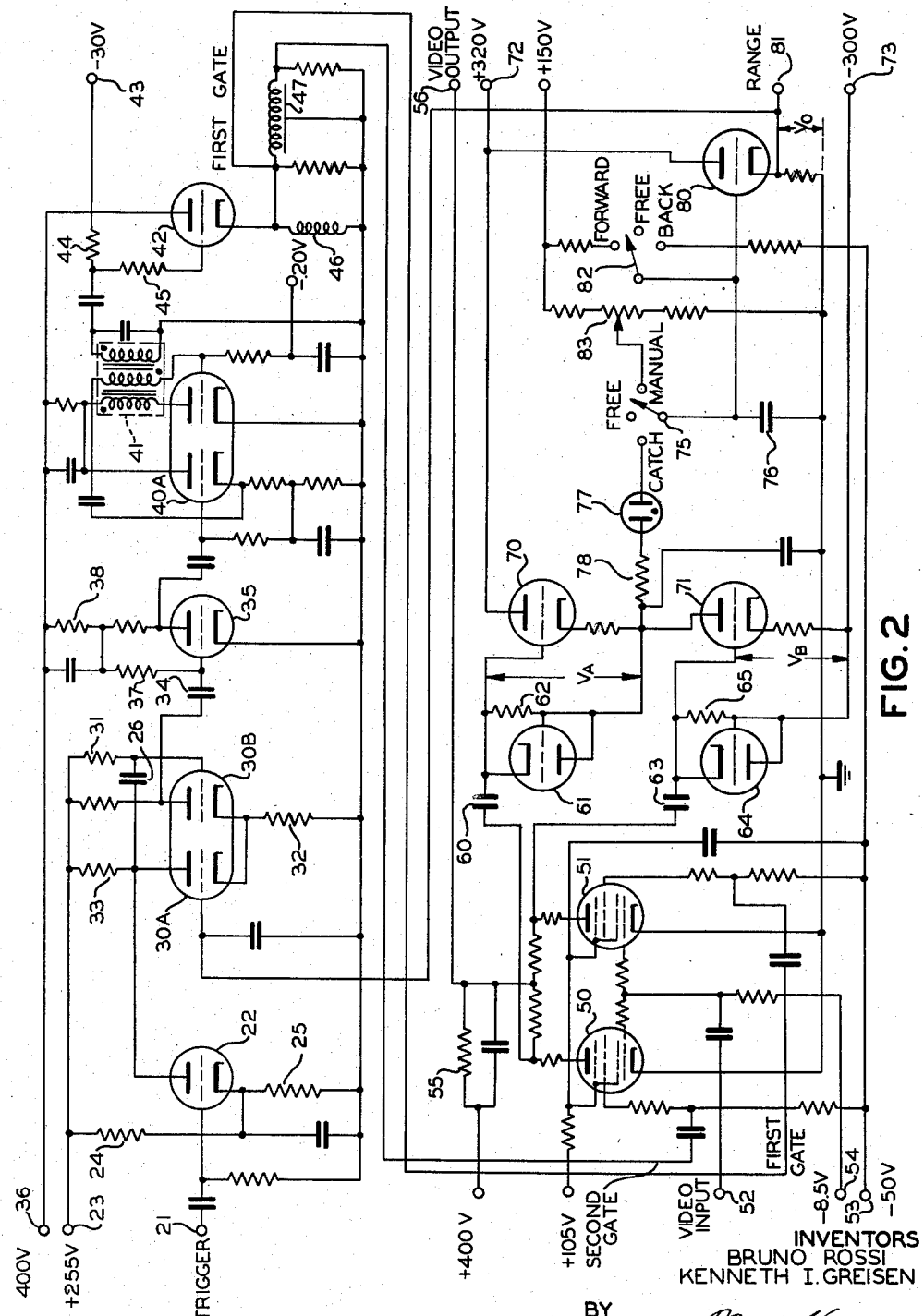

United States Patent Office 2,903,691
Patented Sept. 8, 1959

2,903,691

RANGE TRACKING CIRCUIT

Bruno Rossi, Winchester, Mass., and Kenneth I. Greisen, Los Alamos, N. Mex., assignors to the United States of America as represented by the Secretary of the Navy Application February 1, 1946, Serial No. 644,971

7 Claims. (Cl. 343—7.3)

This invention relates in general to range tracking circuits and more particularly to circuits for the automatic tracking in range of objects located by radar means.

One of the functions of a radar system is to supply information as to the range, or distance, of a target object from the radar. By the word radar used alone here and hereinafter in this specification is meant a complete radar system. In applications involving only a search function or warning as to the approach of the target, accurate range information is not needed. If, however, the information from the radar is to control gunfire, for example, it will be necessary for the radar to supply a continuous flow of accurate range information. Such continuous determination of range is called "tracking" and can be accomplished manually, semiautomatically, or automatically. Since the velocity of propagation of radio energy through free space is an absolute constant for the practical radar case, the precision with which the range to a target can be measured is dependent only upon the accuracy of the device for measuring the time interval between the transmitted pulse and the reflected radar "echo," and upon the skill of the radar operator. An automatic tracking system will eliminate the element of operator skill and provide smoother and more certain response to change of position of the target. In such an automatic tracking system it is desirable to have a voltage delivered which corresponds instantaneously and continuously to the range of the target being tracked, this voltage being used to operate the gun control apparatus.

However, a further complication is added to such automatic tracking problems when the reflected signal from the target "fades" or disappears for a short time. Under such conditions it would be advantageous for the tracking circuit to possess a position "memory," retaining the last reliable range value until the signal reappears and proper corrections can be made.

Accordingly it is a principal object of this invention to provide a circuit for radar systems which will give continuous information as to the range of an object located by the radar.

It is also an object of this invention to provide an automatic range tracking circuit which will retain its range setting when the reflection signal from the target object fades.

It is a further object of this invention to provide an automatic range tracking circuit which will also search automatically for target echoes throughout the range of the radar system.

The above and further objects of this invention will be apparent from the following detailed discussion and the appended drawings, of which:

Fig. 2 is a circuit diagram of one embodiment of the invention; and

Figure 1:
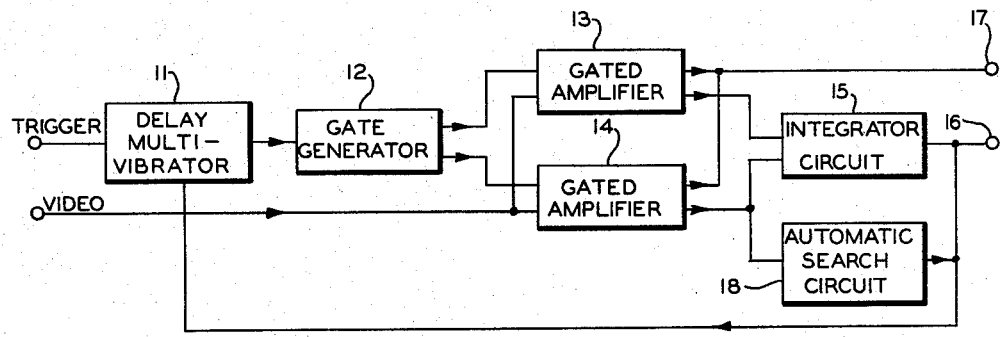
Fig. 1 is a block diagram illustrating the principles of the invention.

The general principle of automatic tracking is illustrated by Fig. 1. To accomplish such tracking, a delay device is used in which the amount of delay may be controlled by a voltage. The delay inserted by the delay device is compared with that of the signal, and any difference is made to generate a change in voltage having a polarity dependent upon whether the delay introduced must be increased or decreased in order to coincide with the signal. This voltage when applied to the delay device maintains the delay in exact coincidence with the signal at all times.

In Fig. 1 a delay multivibrator 11 is triggered in coincidence with the transmitted pulse of the radar. After a time delay which is proportional to the range of the chosen target, delay multivibrator 11 triggers a gate generator circuit 12, which supplies two voltage gates each having a time duration of the same order as that of the echo signal and timed so that one follows directly after the other. By the term voltage gate as here and hereinafter used in this specification is meant a voltage pulse used for gating or otherwise enabling a succeeding circuit. The first voltage gate is supplied to one input of a gated amplifier 13, and the second voltage gate is applied to one input of another similar gated amplifier 14. The video echo signals are applied to separate inputs of both amplifiers. Amplifiers 13 and 14 will amplify only such echo signals as occur in coincidence with the voltage gates from gates generator 12, and the duration of the amplifier outputs will be dependent upon the time of overlap of the echo signal and their respective enabling gates. These outputs are fed to an integrator circuit 15 which produces an output voltage proportional to the integral of the difference between the outputs of amplifiers 13 and 14. This integrated output of circuit 15 is proportional to the range of the target and is fed back to delay multivibrator 11 controlling the delay to cause equal portions of each gate to occur in coincidence with the signal. If, in this system the echo signal overlaps the gates applied to amplifiers 13 and 14 equally, there will be no change in the output of integrator 15 and the range at which the gates occur is unchanged. Should the echo signal overlap the first gate applied to amplifier 13, to a greater extent than the second gate, applied to amplifier 14, the output of integrator 15 will decrease causing the delay of multivibrator 11 to be decreased, and hence causing both gates to occur at an earlier time, correcting the discrepancy in the overlap. If the echo signal overlaps the second gate to a greater extent than the first gate, the reverse effects will occur, the invention thus automatically keeping the video signal symmetrically bracketed by the two gates and providing an output voltage at terminal 16 which is proportional to the instantaneous range of the target. The output obtained at terminal 16 can be used to operate a range indicator or to control the guns in a fire control application. Should the echo signal fade, there will be no output from either of amplifiers 13 or 14. Therefore, the output of integrator 15 will remain constant and the gates will continue to occur at a time corresponding to the range at which a signal was last obtained from the target. When the echo signal from the target reappears, the circuit will automatically correct the position of the gates to correspond to the new range provided the target has not moved to such an extent that the echo signal no longer overlaps either of the two gates. Thus for slow moving targets the circuit possesses "position memory," that is, it will retain the proper range position until the target reappears. An additional output is obtained from both amplifiers 13 and 14 and presented at terminal 17 in the form of a gated output video signal, thus providing the echo signal of the target being tracked, separated from any other target echoes, which gated signal may then be applied to a suitable radar indicator.

If the target has moved so far during the fade time that the echo signal no longer overlaps either of the gates applied to amplifiers 13 and 14, there will be no outputs from these amplifiers and the range of the gates will remain constant. By means of automatic search circuit 18, the output range voltage can be caused to sweep throughout its possible values, thus causing the range at which the gates occur to vary until an echo signal occurs in coincidence with the gates. When such a coincidence occurs, the gates will lock upon the echo signal and the system will continue tracking the target so selected.

Fig. 2 is a detailed circuit diagram of one embodiment of the invention outlined above. A positive trigger is obtained from the radar transmitter in coincidence with the transmitted pulse and applied to the tracking circuit at terminal 21. This trigger is fed to the grid of a triode electron tube 22 which is biased to cutoff by a cathode potential obtained from a potential source at terminal 23 and by means of a voltage divider comprising resistors 24 and 25. The application of the trigger forces triode 22 into conduction and applies a negative signal from its plate to the grid of triode electron tube 30B, being coupled thereto by capacitor 26. Triodes 30A and 30B are the two halves of a double triode electron tube and together perform the functions of a delay multivibrator. In the absence of an external signal, triode 30B will be conducting heavily due to the connection of its grid to the positive potential at terminal 23 through resistor 31. The current through the common cathode resistor 32 due to the conduction of triode 30B will establish at the cathode of triode 30A a positive potential sufficient to keep triode 30A non-conducting. When the above-described negative signal is applied to the grid of triode 30B, it reduces the current through resistor 32 and reduces the potential at the cathode of triode 30A. This permits triode 30A to go into conduction, decreasing the voltage at the plate of 30A. This drop in plate voltage is fed back regeneratively to the grid of triode 30B through capacitor 26, causing triode 30B to be cut off. The time duration of this condition with triode 30A conducting and triode 30B non-conducting will depend upon the time constant for charging capacitor 26 and upon the cathode bias at the cathode of triode 30B due to the current drawn by triode 30A through common cathode resistor 32. The current drawn by triode 30A is in turn dependent upon the voltage applied to its grid, which voltage is proportional to the range of the chosen target and is derived from the output of the tracking circuit in a manner to be explained hereinafter. Thus the time during which triode 30B will remain non-conducting will depend upon the instantaneous range of the chosen target. When capacitor 26 has charged to such an extent that the grid potential of triode 30B has reached a value to cause conduction through triode 30B, the potential drop across common cathode resistor 32 will increase, and this effect will decrease the current drawn by triode 30A. The consequent increase in the plate potential of triode 30A is coupled to the grid of triode 30B through capacitor 26, causing the usual regenerative multivibrator action, restoring the original condition with triode 30B conducting and triode 30A non-conducting. This multivibrator action causes a sharp rise in the plate potential of triode 30B to occur in coincidence with the trigger from the transmitter and a sharp drop in the same plate potential to occur at some later time, the delay being proportional to the instantaneous range of the chosen target. The plate of triode 30B is coupled through capacitor 34 to the grid of triode electron tube 35. Triode 35 is normally conducting heavily due to the connection of its grid to a positive potential source at terminal 36 through resistors 37 and 38. Since triode 35 is effectively saturated, the initial rise in voltage at the plate of triode 30B occurring simultaneously with the trigger from the transmitter will cause no apparent change in the current drawn by triode 35 and hence no change in its plate potential. The delayed sharp drop at the plate of triode 30B will, however, cause a sharp decrease in the current through triode 35 and hence a sharp rise in its plate potential. This positive signal is capacitively coupled to the grid of triode electron tube 40A which is connected as a cathode follower. The positive signal thus obtained at the cathode of triode 40A is coupled to the grid of triode electron tube 40B through the primary of pulse transformer 41. Triode 40B together with pulse transformer 41 constitutes a blocking oscillator which provides a single cycle output to the grid of triode electron tube 42 each time it is triggered by a signal from triode 40A. Triode 42 is normally biased to cutoff by a negative potential applied to terminal 43 and coupled to the grid through resistors 44 and 45. Due to this cut-off bias, only the positive part of the output of the blocking oscillator will be passed by triode 42. Triode 42 is connected as a cathode follower of somewhat special design since an inductance 46 is used as the cathode load. Inductance 46 is used instead of the usual resistance in order to increase the sharpness of the leading and trailing edges of the positive gate voltage or pulse passed by triode 42. Triode 42 and delay line 47 constitute a gate circuit or generator, with two outputs, one directly from the cathode of triode 42 (the first gate) and one (the second gate) through delay line 47 which delays the second output by a time approximately equal to the duration of the pulse transmitted by the radar. Since the gates are adjusted to be approximately of the same time duration as the transmitted pulse, this duality of outputs results in the two gates being timed so that one follows directly after the other. The delayed, or second gate is applied to the third grid of electron tube 50 and the undelayed or first gate is applied to the third grid of electron tube 51, while the echo signal from the radar receiver is applied at terminal 52 and capacity coupled to the first grids of both tubes 50 and 51. The third grids of tubes 50 and 51 are biased to cutoff by a potential applied at terminal 53 and the first grids of both tubes are biased almost to cutoff by a potential applied at terminal 54. Under these circumstances no appreciable current flows in either of tubes 50 and 51 unless the echo signal arrives in coincidence with the respective gates from triode 42. When such a coincidence occures, the charge which flows through either tube 50 or 51 is proportional to the area of overlap (on a voltage-time plane) of the echo signal and the corresponding gate. The current passed by both tubes causes a change in the voltage drop across common plate resistor 55 and this signal is supplied at terminal 56 as a selected output video signal whose magnitude is proportional to that of the echo signal applied at terminal 52. The output of tube 50 is separately coupled through capacitor 60 to diode electron tube 61. The charge which flows through diode 61 and which charges up capacitor 60 is proportional to the charge which flows through tube 50. When the tube 50 has ceased conducting the charge thus placed on capacitor 60 leaks back through resistor 62, establishing an average potential drop $V_A$ arcross resistor 62 which is proportional to the area of overlap between the echo signal and the second gate. In a similar fashion the output of tube 51 causes a charge to be placed on capacitor 63 by conduction through diode electron tube 64, and the consequent leaking off of this charge through resistor 65 establishes an average potential drop $V_B$ across resistor 65 which is proportional to the area of overlap of the echo signal and first gate. The potentials $V_A$ and $V_B$ so obtained are applied to the respective control grids of electron tubes 70 and 71 which together with tubes 61 and 64 comprise the integrator circuit. Since the circuit parameters are the same for tubes 70 and 71, if voltages $V_A$ and $V_B$ are equal the current flowing through tubes 70 and 71 will establish at the plate of tube 71 a potential which will be approximately the average of the potentials available at terminals 72 and 73. With switch 75 in the "Catch" position, capacitor 76 will charge through neon tube 77 and resistor 78 until the voltage across capacitor 76 is approximately equal to that at the plate of tube 71. The voltage across capacitor 76 is applied to the grid of electron tube 80, which then supplies at its cathode a voltage $V_0$ proportional to the range which is connected to an output terminal 81 and is also fed back to the grid of triode 30A to control the delay of the delay multivibrator as previously described. If $V_A$ differs from $V_B$, there will be established at the plate of tube 71 a voltage approximately equal to $$\frac{\mu}{2}(V_A - V_B)$$

where $\mu$ is the amplification factor of tubes 70 and 71. Capacitor 76 will charge through tube 77 and resistor 78 toward this new value of voltage at the plate of tube 71. The rate of change of voltage across capacitor 76 will be proportional to $V_A - V_B$ or to the difference in areas of overlap of the echo signal and respective gates applied to tubes 50 and 51. If the echo signal overlaps the first gate to a greater extent than the second gate, the quantity $V_A - V_B$ will be positive, and the change of voltage across capacitor 76 will be positive. This will increase the output $V_0$ of tube 80, increasing the delay introduced by the delay multivibrator, composed of tubes 30A and 30B, and thus increasing the range at which the gates occur to agree with the increased range of the target. If the opposite is true, $V_A - V_B$ will be negative and the output $V_0$ will decrease, thus decreasing the delay of the gates. If the echo signal overlaps the two gates equally, $V_A - V_B$ will be zero and the potential at the plate of tube 71 again becomes the quiescent value. However, the voltage across capacitor 76, and hence the output voltage $V_0$, will not change since neon tube 77 will provide also perfect isolation as long as the difference between the voltage across capacitor 76 and the voltage at the plate of tube 71 does not exceed the firing potential of neon tube 77. In this manner the output voltage $V_0$ is kept proportional to the range of the target, and the echo signal is automatically kept centered in the gates. If the echo signal fades, $V_A$ and $V_B$ will both be equal to zero, and hence $V_0$ will remain unchanged, keeping the range at which the gates occur constant until the signal reappears, when the delay will be automatically adjusted to the proper value. If the signal reappears at a new range such that there is no overlapping of the signal at either one of the gates, there will be no output from tubes 50 and 51 to change $V_0$. However, switch 82 can be thrown to the "Forward" position and this connection will cause the output voltage $V_0$ to increase, increasing the range at which the gates occur. Throwing switch 82 to the "Back" position will cause the range to decrease. If switch 82 is thrown to the "Free" position as soon as an echo signal overlaps the gates, the circuit will lock upon that echo signal and continue tracking. For the purpose of selecting one of several signals, switch 75 can be thrown to the "Free" position and the voltage $V_0$ changed by use of switch 82. For manual tracking switch 75 is placed in the "Manual" position and the range varied manually by means of potentiometer 83.

Figure 3:
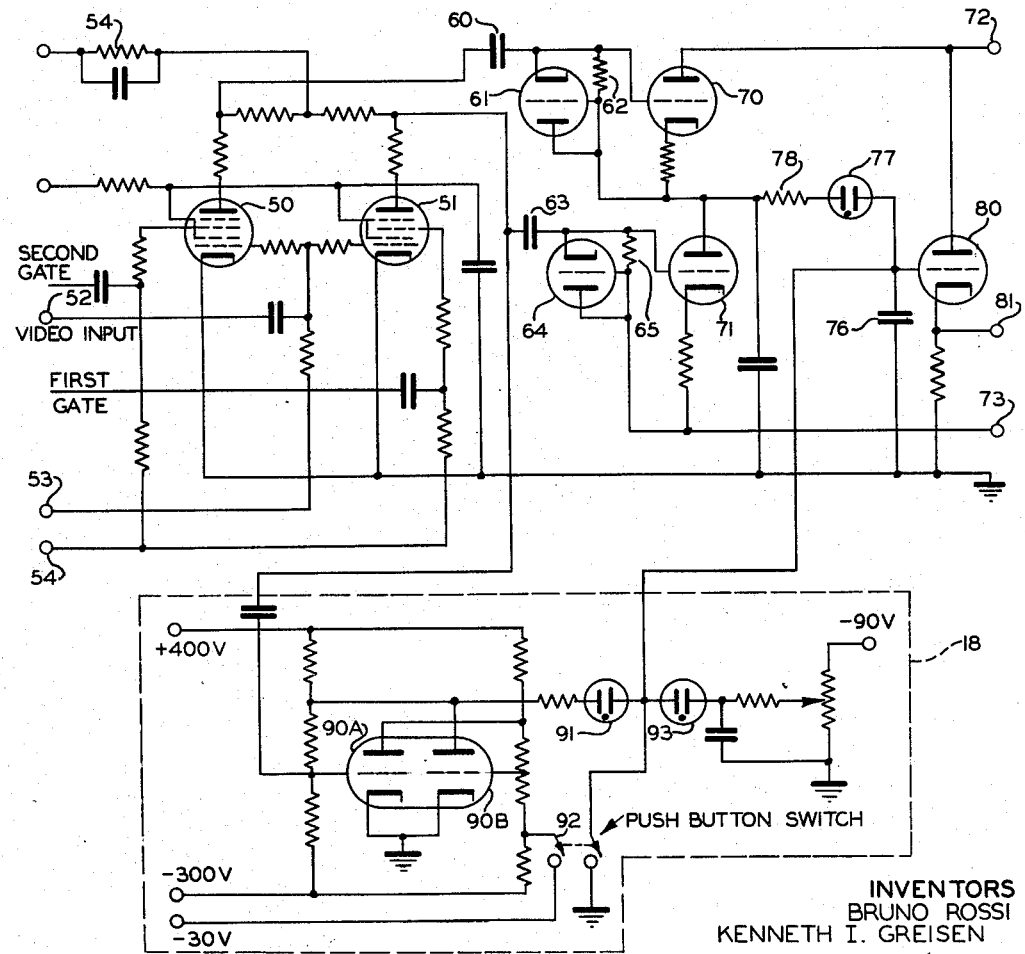
Fig. 3 is a partial circuit diagram showing an automatic search circuit added to the embodiment of Fig. 2.

For some applications, it is desirable to be able to press a button and have the circuit search very rapidly and repeatedly over the entire range. For this purpose the circuit may be modified as shown in Fig. 3 in which the circuit of Fig. 2 has been modified by omitting switches 75 and 82 and their associated potential supply circuits and adding the automatic search circuit 18 shown enclosed in a dotted rectangle. In circuit 18 two triode electron tubes 90A and 90B constitute a multivibrator with two conditions of equilibrium. With triode 90B conducting the voltage across neon tube 91 is below its striking or firing potential and so capacitor 76 is isolated from the multivibrator. Momentarily pressing push button switch 92 closes the left hand contacts shown to cut off triode 90B and start triode 90A conducting. Capacitor 76 will then charge through neon tube 91 until it reaches a potential sufficient to fire neon tube 93. It will then discharge through tube 93 and charge again through tube 91, thus acting as a relaxation oscillator as long as triode 90B is non-conducting. This oscillation of the potential across capacitor 76 will cause the range voltage $V_0$ and the voltage gates to search rapidly back and forth over the entire range. However, as soon as an echo signal coincides with the gates, the output of tube 51 will be applied as a negative signal to the grid of triode 90A. This causes triode 90A to become non-conducting and triode 90B to again go into conduction effectively isolating capacitor 76 from the automatic search circuit, resulting in the system locking on the echo signal and tracking in the manner above described. The function of the right-hand contacts of switch 92 is to short capacitor 76 to ground when this switch is momentarily pressed and thus cause the circuit to search outwardly to maximum range from zero range. If this is not desired, these right hand contacts may be omitted, resulting in the circuit searching outwardly to maximum range from the range setting of the circuit when switch 92 was pressed.

The above description of certain embodiments has been presented for the purpose of illustrating the principles of the invention. The scope and spirit of the invention are defined in the appended claims.

What is claimed is:

1. A target tracking circuit comprising, means for transmitting signals, means for detecting said signals upon reflection thereof by a first target, means responsive to said detected signals for continuously and automatically measuring the range of said first target, means for retaining the range measurement upon fading of said reflected signal, and means for causing said range measuring device to automatically search for alternative targets upon loss of said first target.

2. An automatic target range tracking circuit comprising, means for detecting a signal reflected from said target, means for generating a pair of voltage pulses bracketing said reflected signal, a pair of coincidence circuits to one of which the first of said bracketing pulses and said reflected signal are applied, to the other of which the second of said bracketing pulses and said reflected signal are applied, means responsive to the larger of the outputs of said coincidence circuits for relocating said bracketing pulses relative to said reflected signal, and means for maintaining the position of said bracketing pulses during periods when said reflected signal fades.

3. In combination with an object locating system having a transmitter for periodically radiating radio frequency search pulses and a receiver for subsequently detecting these pulses after reflections from remote targets, an automatic range tracking circuit comprising means for producing first and second voltages the amplitudes of which are proportional to the amount of time coincidence between a selected target pulse detected by said receiver and each pulse of a pair of consecutive gate pulses generated a controllable time after the radiation of said search pulses, a source of voltage having a quiescent value, means for changing the magnitude of said source from said quiescent value in response to the production of unequal amplitude first and second voltages, the amount of said change being proportional to the difference in amplitudes of said voltages and the direction of said change being determined by whichever of said voltages has the larger amplitude, a storage capacitor, means including a neon tube for connecting said capacitor to said source of voltage, said neon tube isolating said capacitor from said source and maintaining a constant voltage thereacross whenever the voltage difference between said source and said capacitor is less than the breakdown potential of said neon tube whereby said capacitor performs as a memory device, and means responsive to the voltage on said storage capacitor for determining the time of generation of said consecutive gate pulses.

4. In combination with an object detecting system having a transmitter for intermittently radiating radio frequency search pulses and a receiver for detecting these pulses after reflections from remote targets, an automatic range tracking circuit comprising means for producing first and second voltages the amplitudes of which are proportional to the amount of time coincidence between a selected target pulse detected by said receiver and each pulse of a pair of consecutive gate pulses generated a controllable time after the radiation of said search pulses, a source of voltage having a quiescent value, means for varying the magnitude of said source from said quiescent value by an amount and in a direction determined by the relative amplitudes of said voltages, a storage capacitor, means for initially charging said capacitor to a voltage level approximating said quiescent value, and means thereafter responsive to a predetermined voltage difference between the voltage on said capacitor and the voltage of said source for coupling said capacitor to said source, said last-mentioned means comprising a neon tube having a breakdown potential equal to said voltage difference, interconnected between said source and said capacitor, and means responsive to the voltage on said capacitor for determining the time of generation of said consecutive gate pulses.

5. In the system as defined in claim 4, means for cyclically varying the voltage on said capacitor whenever said selected target pulse fails to coincide with a portion of either pulse of said pair of consecutive gate pulses whereby the time of generation of said consecutive gate pulses is continuously varied with respect to the time of radiation of said search pulses, and means for disabling said last-mentioned means in response to the production of said first or second voltages.

6. An automatic range tracking circuit comprising, means for transmitting a signal, a delay multivibrator whose delay is proportional to the range of a particular target on which said signal impinges, a gate generator producing two voltage gates each having a time duration of the same order as that of said signal when reflected from said target and so timed that one of said voltage gates follows directly after the other, said gate generator being triggered by said delay multivibrator, two amplifiers each being enabled by one of said output voltage gates of said gate generator, both of said amplifiers being supplied with the reflected signal, an integrator circuit fed by the outputs of said amplifiers, the output of said integrator being proportional to the difference between the areas of overlap of said reflected signals and the respective voltage gates, a range capacitor fed by said integrator circuit, the voltage across said range capacitor being proportional to the range of said target, and a neon tube isolating said range capacitor from said integrator circuit during periods when the reflected signal has faded enabling said range capacitor to retain the range voltage during such fade periods.

7. In combination with claim 6 an automatic search circuit comprising, a multivibrator triggered from one stable condition by the momentary connection of a negative potential to the grid of the normally conducting electron tube, a first neon tube coupling said range voltage capacitor to the plate of said normally conducting tube, a second neon tube coupling said range voltage capacitor to a negative potential, said range voltage capacitor and said first and second neon tubes in conjunction with said negative potential and the potential existing at said electron tube plate during its cut-off period, acting as a relaxation oscillator sweeping said range output voltage and said delay rapidly and repeatedly through their ranges, said multivibrator being triggered from its second stable condition by said reflected signal from one of said gated amplifiers, the reversal of the multivibrator reducing the plate potential of said normally conducting tube and effectively isolating said range voltage capacitor from said positive potential permitting said tracking circuit to lock on said reflected signal.

References Cited in the file of this patent

UNITED STATES PATENTS

| | | |
|---|---|---|
| 2,373,145 | Sensiper et al. | Apr. 10, 1945 |
| 2,410,424 | Brown | Nov. 5, 1946 |
| 2,415,855 | Skellett | Feb. 18, 1947 |
| 2,416,088 | Deerhake | Feb. 18, 1947 |
| 2,418,364 | Moe | Apr. 1, 1947 |
| 2,467,208 | Hahn | Apr. 30, 1949 |
| 2,495,753 | Mozley | Jan. 31, 1950 |
| 2,516,356 | Tull et al. | July 25, 1950 |
| 2,538,027 | Mozley et al. | Jan. 16, 1951 |
| 2,543,072 | Stearns | Feb. 27, 1951 |
| 2,609,533 | Jacobsen | Sept. 2, 1952 |
| 2,628,349 | Nightenhelser | Feb. 10, 1953 |
| 2,709,804 | Chance et al. | May 31, 1955 |